United States Patent [19]

Deneen

[11] Patent Number: 4,511,004

[45] Date of Patent: Apr. 16, 1985

[54] APPARATUS FOR DRILLING A PLURALITY OF BORES IN A LAWN

[76] Inventor: Michael Deneen, 4112 W. Driftwood Dr., Holiday, Fla. 33590

[21] Appl. No.: 489,511

[22] Filed: Apr. 28, 1983

[51] Int. Cl.³ .............................................. A01B 45/02
[52] U.S. Cl. ........................................ 172/21; 172/43; 172/78; 172/400; 280/43.13
[58] Field of Search ........................ 172/21, 22, 42, 43, 172/75, 78, 111, 259, 400, 429; 280/43.13

[56] References Cited

U.S. PATENT DOCUMENTS

| 622,348 | 4/1899 | Haiman et al. | 172/400 |
| 2,236,562 | 4/1941 | Brandes | 172/22 |
| 2,303,726 | 12/1942 | Dettloff et al. | 172/21 |
| 2,730,374 | 1/1956 | Rogers et al. | 280/43.13 |
| 2,918,130 | 12/1959 | Thom | 172/22 |
| 3,015,364 | 1/1962 | Fitzgerald | 172/22 |
| 3,357,715 | 12/1967 | Plamper et al. | 280/43.13 |
| 3,490,540 | 1/1970 | West et al. | 172/21 |
| 3,566,973 | 3/1971 | Blair | 172/21 |
| 3,677,574 | 7/1972 | Cyr | 280/43.13 |
| 4,011,913 | 3/1977 | Davies et al. | 172/42 |

FOREIGN PATENT DOCUMENTS

| 226782 | 1/1960 | Australia | 172/21 |
| 534999 | 11/1958 | Belgium | 172/21 |

Primary Examiner—Richard T. Stouffer
Attorney, Agent, or Firm—Ronald E. Smith

[57] ABSTRACT

An apparatus of the type designed to drill a plurality of equidistantly spaced bores of differing diameters in a lawn. The bores of smaller diameters are intended to aerate the lawn to provide holes into which seeds, water, and fertilizer can be deposited. Bores of larger diameters are intended to receive plugs of grass. The apparatus has the general appearance of a conventional lawnmower, having a planar in configuration base member and an insulated handle pivotally attached thereto. A linkage is provided to raise and lower the base member responsive to repositioning of the handle member. The drill bits are provided with welded ridges or heat treated flanges and are connected in driven relation to a motor mounted upwardly of the base member by a pulley and belt arrangement that differs depending upon the number of drill bits provided for a specific embodiment of the invention.

8 Claims, 27 Drawing Figures

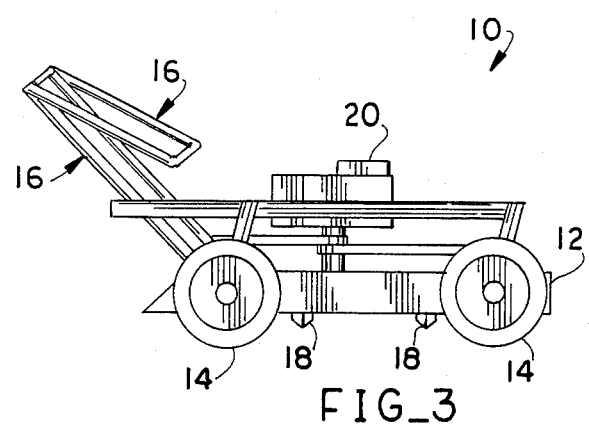
FIG_3
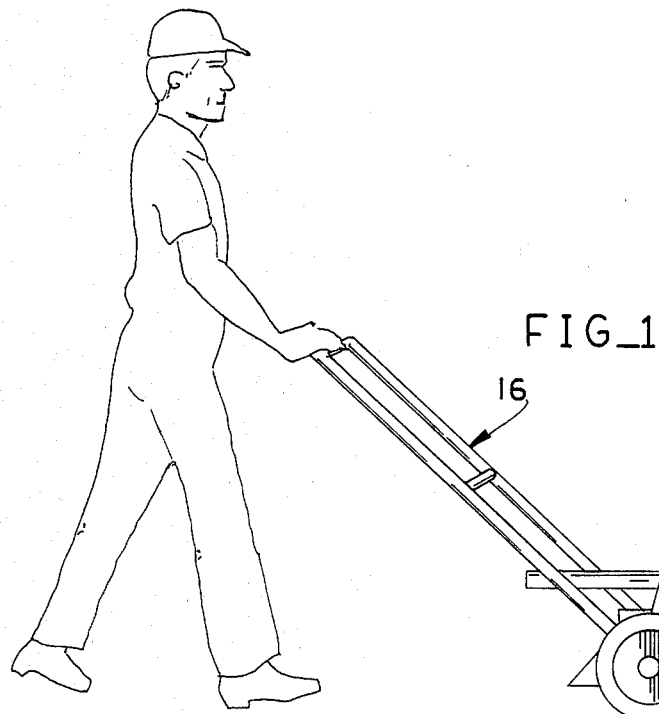
FIG_1
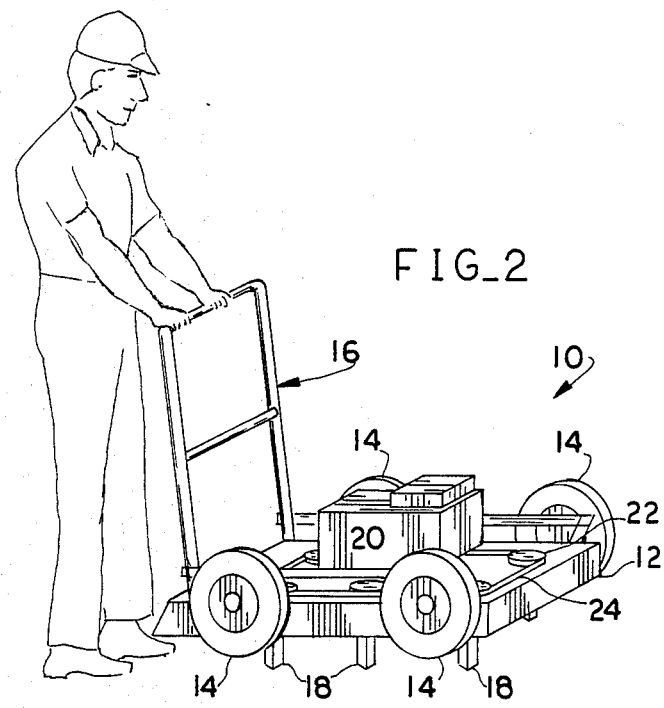
FIG_2
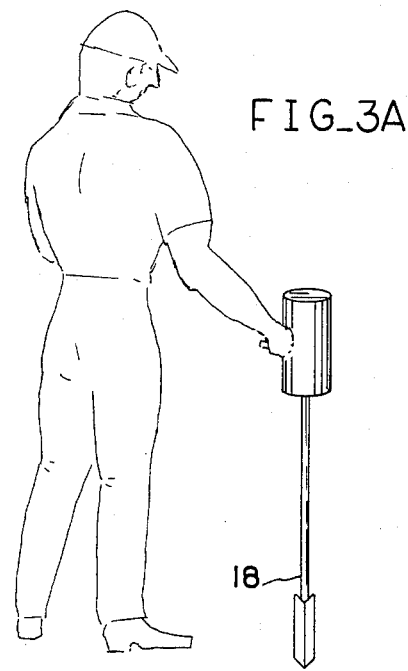
FIG_3A

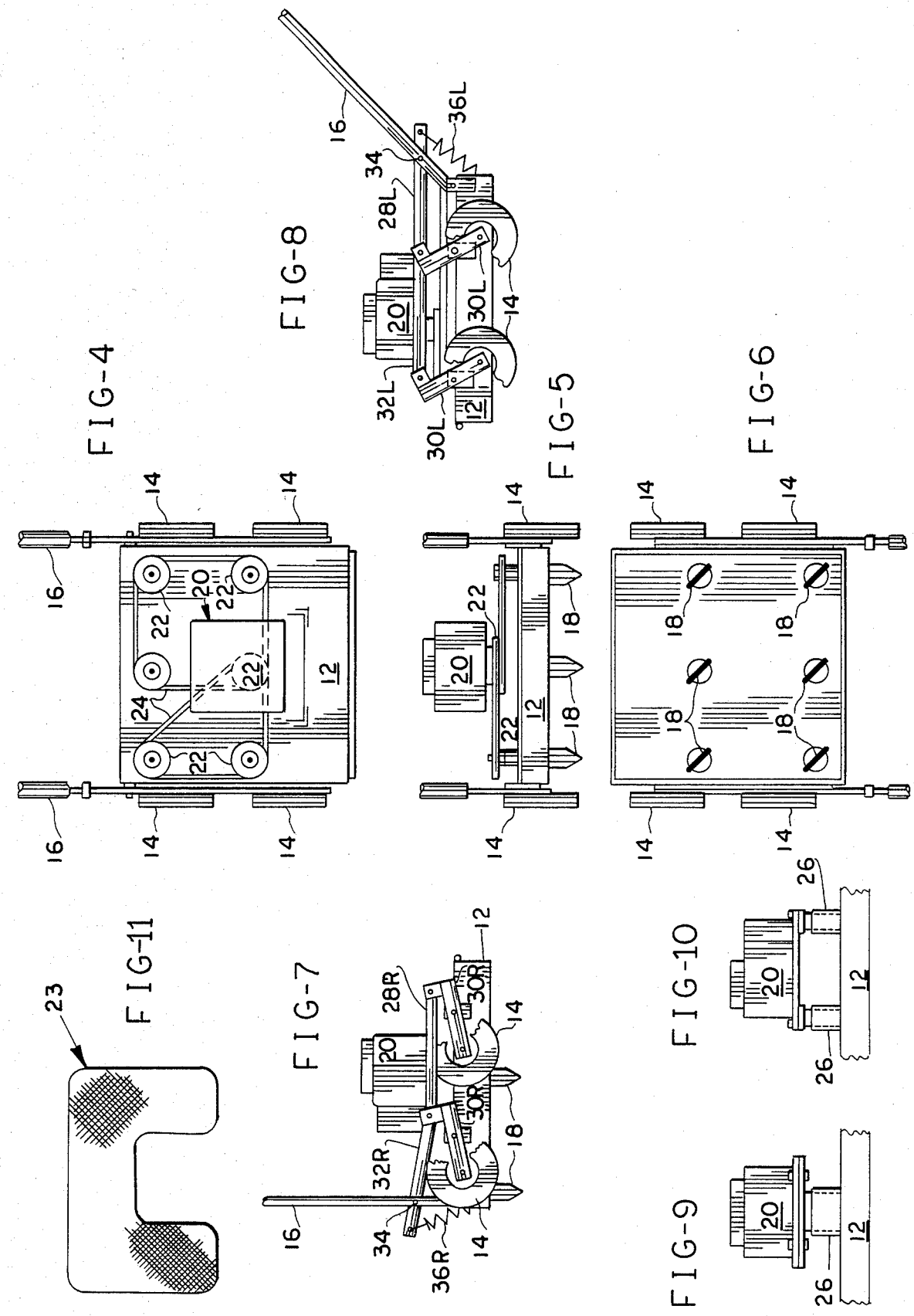

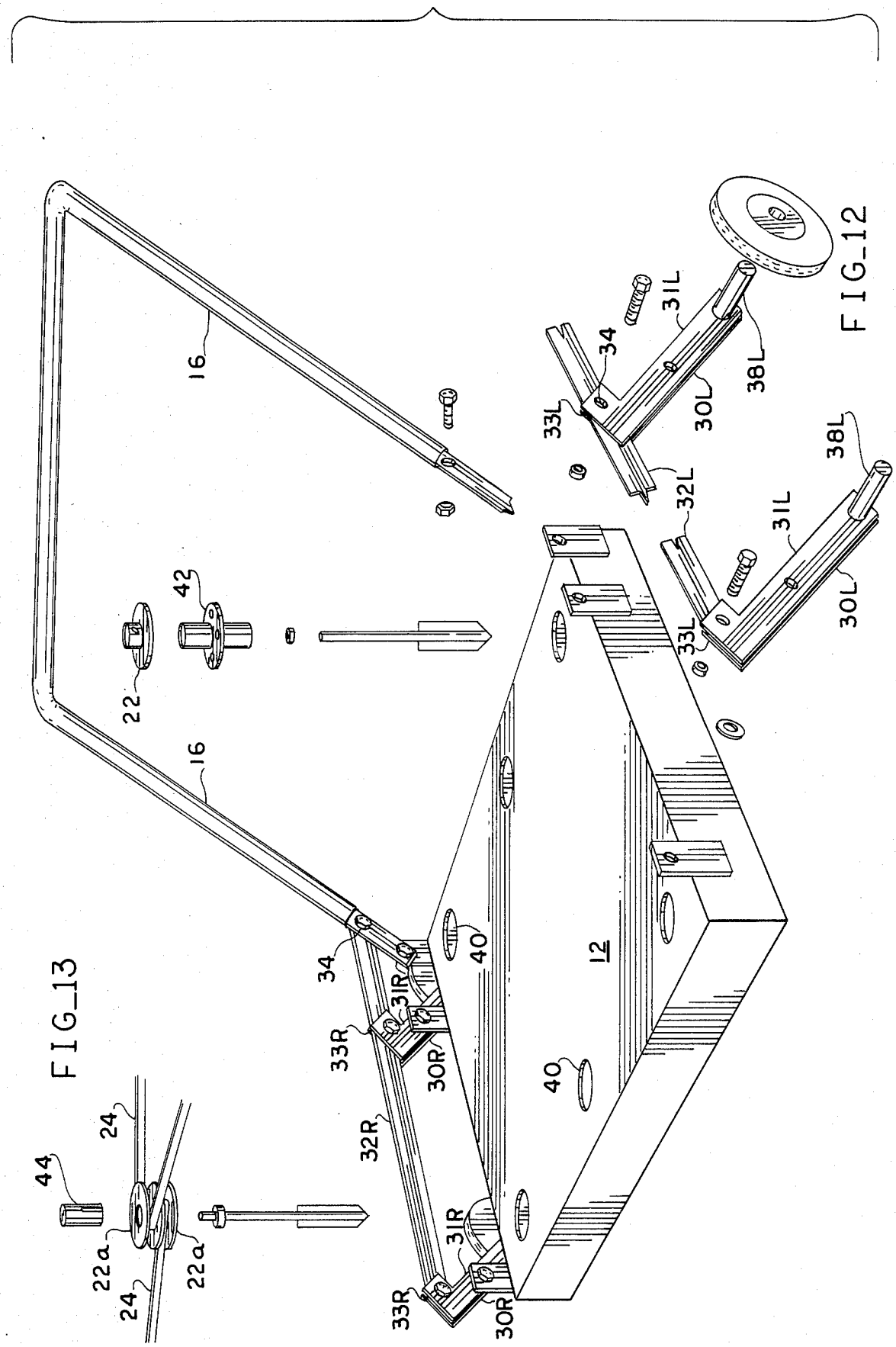

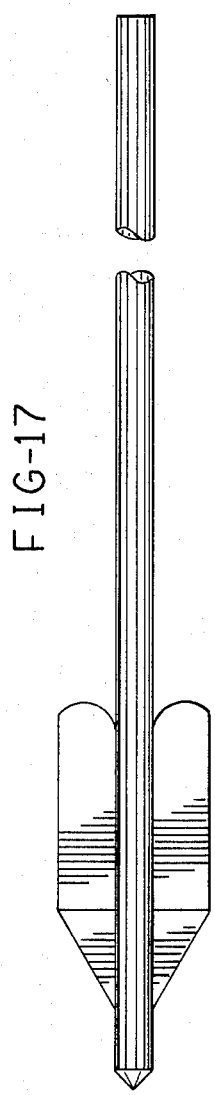
FIG-17
FIG-17A
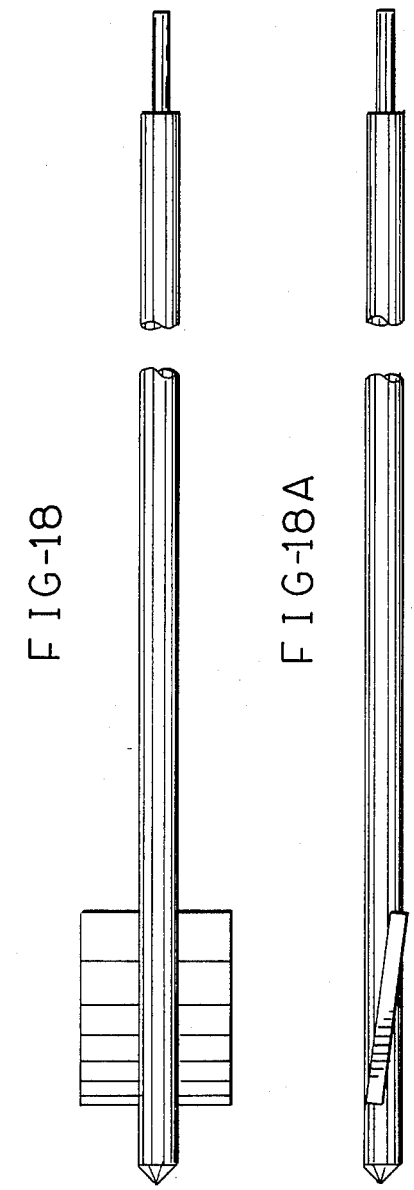
FIG-18
FIG-18A

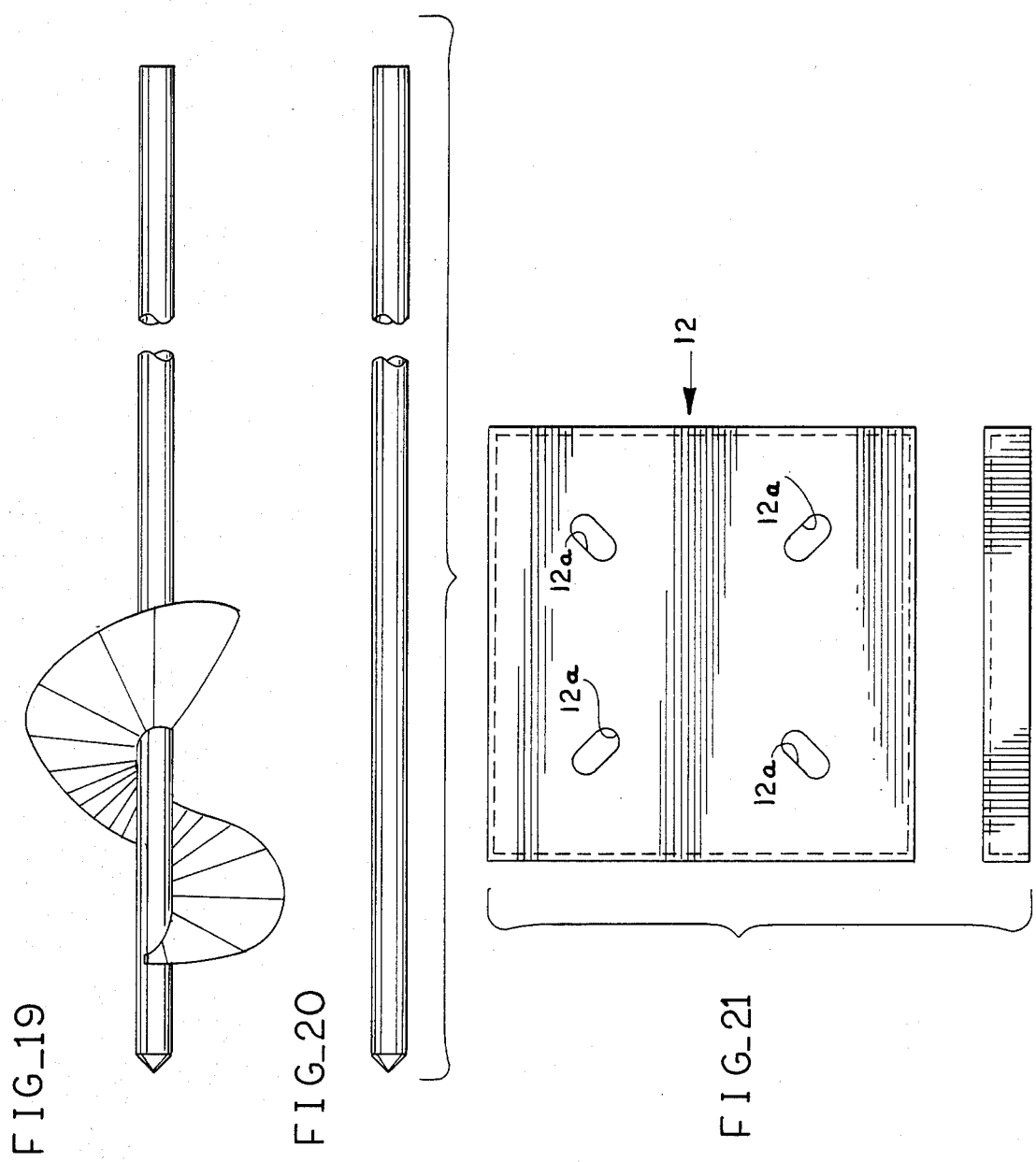

APPARATUS FOR DRILLING A PLURALITY OF BORES IN A LAWN

BACKGROUND OF THE INVENTION

1. Field of the Invention

This invention relates, generally, to lawnmower-type devices, and more specifically relates to such a device adapted to drill a plurality of equidistantly spaced bore members in a lawn or other ground surface.

2. Description of the Prior Art

When a developer is building new homes, it is a common practice to operate a bulldozer over the construction site to remove weeds, rocks, and other clutter often associated with undeveloped home building sites. Thus, when the home construction is completed, it becomes necessary to install a lawn to provide an attractive home site. In such situations, it is a common practice to install a plurality of square-in-configuration sod members to construct the desired lawn. Many times, however, the developer will install a cheap, relatively undesirable type of grass. As a consequence, many home owners desire to upgrade their lawns by substituting a better variety of grass for the lawn that was purchased with the home. In such cases, it is possible to simply use a bulldozer to strip away the undesired lawn, and to re-sod the lawn with the improved variety of grass, or to plug grass stock of improved varieties. Of course, this is a rather expensive proposition. Therefore, it has become a common practice to convert a lawn of one type to a lawn of an improved type by planting relatively small plugs of the new, more desirable grass, at preselected intervals throughout the undesirable lawn. In this manner, the expansion of the new, desirable grass will gradually eliminate the old, undesirable grass.

The conventional method of installing the plugs involves digging individual holes in the lawn to be replaced, and individually filling each hole with a plug of the new grass. Since the new plugs are usually spaced about 12 to 18 inches apart from one another (although spacings may range from 6 inch centers to 18 inch centers, depending upon the size of plug employed), a very high number of holes must be dug in the old lawn when this plugging procedure is followed. Several tools have been devised to drill the holes that are needed. However, all of the known tools are simply variations of the well-known type of tool that is commonly used for digging holes into which fence posts are to be inserted. As such, these tools can dig but one hole at a time. Accordingly, a consumer desiring to convert a lawn from one type of grass to another must pay a rather high fee to the commercial companies that provide the plugs for the new lawn, due to the number of workers that must be hired to dig the needed holes. Moreover, since each hole is individually dug, measurements must be made to assure that all of the holes are drilled at 18 inch centers.

There is clearly a need for a device that would lower the cost to consumers of converting from one lawn type to another. The needed device would enable a home owner or custom worker contracted with the device to drill more than one hole simultaneously, would drill such plurality of holes at the desired spacing, and would allow the drilling of 2500–4000 holes per hour. Ideally, the apparatus could be operated by one individual, would be lightweight, and thus easily transportable from one location to another, could be rented from hardware stores, garden shops, and the like, and would be of easy-to-maintain construction, but the needed device does not appear in the prior art.

SUMMARY OF THE INVENTION

The longstanding but heretofore unfulfilled need for an apparatus capable of drilling a plurality of equidistantly spaced bores of uniform dimension in a ground surface is now provided in the form of a machine that carries a plurality of rotatably mounted, equidistantly spaced, drill bits in a base member that is raised or lowered out of or into, respectively, drilling relation to the ground responsive to manipulation of a pivotally mounted handle member. The drill bits may be arrayed in a number of operative positions, depending upon the number of drill bits provided in a given embodiment of the machine, such that each drill bit is contiguous to at least one other drill bit. The mounting means for each drill bit essentially comprises an apertured base member wherein each aperture receives the spindle portion of a drill bit whereby the operative portion of each drill bit is disposed below the plane of the base member and such spindle portion is disposed above such plane. A motor means is also disposed above the plane of the base member, and has a rotatable output shaft upon which pulley members are mounted for conjoint rotation therewith. The output shaft pulley members are interconnected with pulley members mounted on the individual spindle portions of each drill bit by suitable belt means, so that rotation of the output shaft pulleys effects a simultaneous, corresponding and conjoint rotation of the pulley members secured to the individual drill bit spindle portions. In this manner, operation of the motor effects rotation of each drill bit. The base member itself is linked to the handle means so that when the handle means is positioned in a substantially vertical plane, the base member is lowered relative to the ground surface so that the drill bits disposed thereunder enter into drilling relation to such ground. A linkage is specifically constructed so that returning the handle means to a plane disposed generally 45 degrees from the horizontal will effect a raising of such base means and hence disengagement of the drill bits and the ground surface so that the apparatus can be transported to another location for further drilling.

It is therefore seen to be the primary object of this invention to provide an apparatus that can simultaneously drill a plurality of equidistantly spaced, uniform dimension bore members in a lawn or other ground surface.

A closely related object of the invention is to provide such a device in the form of an apparatus that can be handled by one individual both during the actual drilling procedure and in the subsequent repositioning of the apparatus.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view showing the machine being transported from one location to another by a single individual.

FIG. 2 is a perspective view showing the pivotally mounted handle member of the invention disposed in a vertical plane, which position of the handle places the drill members in drilling relation to the ground surface.

FIG. 3 is a perspective view showing the handle means of the inventive apparatus in its folded condition so that the inventive machinery can be stored in a small space.

FIG. 3A shows homeowner use of a single bit driven by a drill.

FIG. 4 is a top plan view of the base means of the invention, showing an embodiment employing 6 drill bit members.

FIG. 5 is a rear elevational view of the embodiment shown in FIG. 4.

FIG. 6 is a bottom plan view of the embodiment shown in FIGS. 4 and 5.

FIG. 7 is a side elevational view of such embodiment, showing the linkage that is connected to the pivotally mounted handle member, which interconnection effects raising and lowering of the operative portions of the invention. Such linkage is shown in its operative working position.

FIG. 8 is a side elevational view of such embodiment showing the transport position of the inventive linkage and handle means.

FIG. 9 is a front elevational view of the motor means used with the invention and its mounting means, which view is taken along line 9—9 of FIG. 4.

FIG. 10 is a side elevational view of the structure shown in FIG. 9.

FIG. 11 is a top plan view of the safety grill that overlies the pulley members shown in FIG. 4.

FIG. 12 is an exploded perspective view that shows how the various parts of the preferred embodiment are assembled.

FIG. 13 is an exploded perspective view showing the belt and pulley assembly that interconnects the output shaft of the motor means with the individual drill bit members.

FIG. 17 is a side elevational view of another embodiment of a drill bit.

FIG. 17a is a side elevational view of the embodiment shown in FIG. 17.

FIG. 18 is a top plan view of another embodiment of a drill bit.

FIG. 18a is a side elevational view of the embodiment shown in FIG. 18.

FIG. 19 is a top plan view of yet another embodiment of a drill bit that may be used in connection with the inventive apparatus, showing a helical blade.

FIG. 20 is a side elevational view of an unbladed drill bit means of the type useful in aerating soil.

FIG. 21 is a top plan view of an alternative base member.

DESCRIPTION OF THE PREFERRED EMBODIMENT

Figure 16A:
FIG. 16a is a top plan view of the aerator means shown in FIG. 16.

Referring now to FIGS. 1 and 2, it will there be seen that the inventive apparatus is designated by the reference numeral 10 as a whole. The inventive apparatus includes a flat, planar in configuration, generally rectangular base member 12 that is supported at its respective corners by a plurality of rotatably mounted wheel members that are collectively designated 14. An insulated handle member 16 is pivotally attached to the base member 12 in a manner that will be more specifically shown and described hereinafter, said handle member being disposed generally as shown in FIG. 1 when the inventive apparatus 10 is being transported from one location to another, and being generally vertical disposed as shown in FIG. 2 when the machine 10 is performing its intended function.

As shown in FIG. 3, the handle member 16 is provided with hinges substantially midlength thereof to permit folding of such handle member when the machine is to be stored in a small space.

In FIGS. 1–3, the drill bit members are diagrammatically shown and are collectively designated 18. The motor means that effects rotation of the drill bits 18 when the inventive apparatus is operating is diagrammatically shown and referred to as 20.

Referring now to FIG. 4, it will there be seen that the motor means 20 is preferably disposed substantially centrally of the base member 12, and is mounted upwardly thereof as is shown in FIGS. 5, 9, and 10. (The mounting means of FIGS. 9 and 10 is omitted from FIG. 5 to simplify the latter FIG.) It should be understood from the outset that, in view of the teachings of this invention, virtually any number of drill bits in virtually any configuration can be rotatably mounted for conjoint rotation with a motor means. However, to avoid unduly lengthening this description, the embodiment shown and described will employ six (6) drill members as shown in FIG. 4. As is shown in FIG. 5, each drill bit 18 has its operative portion disposed below the plane of the base member 12, and has its spindle portion disposed above such plane. A pulley member 22 (FIG. 4) is fixedly secured to the spindle portion of each drill bit 18, and is therefore conjointly rotatable therewith. Motor means 20 has a downwardly extending output shaft that is not shown to simplify the drawings, and a pair of pulley members, collectively designated 22a, are fixedly secured thereto for conjoint rotation therewith, as perhaps best understood from an inspection of FIGS. 4 and 5. Pulleys 22a are interconnected with the remaining pulleys 22 by conventional belt members 24 having the specific path of travel shown in FIG. 4. Again, it must be emphasized that different paths of travel may be provided, depending upon the number of drill bits to be utilized in a particular embodiment. In some configurations, for example, the output shaft of the motor 20 could carry only one pulley 22a, or more than two of such pulleys 22a.

The motor 20 is preferably mounted as shown in FIGS. 9 and 10 so that it can be removed from its mounts if desired. Accordingly, the preferred mounting means includes a telescoping arrangement referred to generally by the reference numeral 26, which arrangement 26 includes a pair of longitudinally spaced, upstanding cylindrical mounting members that slidingly receive complementally formed mounting members, all of which should be clear from an inspection of FIGS. 9 and 10.

The inventive linkage that accomplishes the raising and lowering of the base member 12 and hence of the drill bits 18 is shown in FIGS. 7 and 8. The linkage is designated generally as 28R in FIG. 7 and generally as 28L in FIG. 8. The individual link elements that collectively comprise the inventive linkage 28 are designated by the reference numerals 30R, 30L and 32R, 32L. As shown in FIGS. 7 and 8, link elements 30 have a first, linear in configuration, elongate portion and a truncate portion disposed in offset relation to such elongate portion at the distal end thereof. The proximal end of each elongate portion 30 provides a rotatable mount for the wheels 14, as perhaps best shown in FIG. 12, whereas each offset portion thereof is pivotally connected to the link elements 32R, 32L. To complete the linkage, each element 32 is pivotally connected as at 34 to the handle member 16, and a bias means 36 interconnects such link element 32 with the base means 12.

As mentioned above, the link elements 30 are seen in greater detail in FIG. 12. The aforementioned elongate portions are designated 31L, 31R and the aforementioned truncate, offset portions are designated 33R, 33L. Each link element 30 is provided with an axle 38 to accomplish the rotatable mounting of the individual wheel members 14. FIG. 12 also shows the apertures 40 that are formed in the base member 12 to receive the spindle portion of the drill bits 18. Moreover, FIG. 12 shows a hub member 42 that interconnects the individual drill bits 18 and their respective pulley members 22.

FIG. 13 shows elements already described, and also shows, diagrammatically, the engine output shaft 44 that drives the operable elements of the inventive apparatus.

Figure 16:
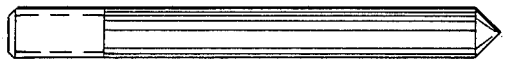
FIG. 16 is a side elevational view of an unbladed drill bit useful for aerating soil, which also may be mounted in the adapter of FIG. 14.
Figure 14A:
FIG. 14a is a top plan view of the adapter member shown in FIG. 14.
Figure 14:
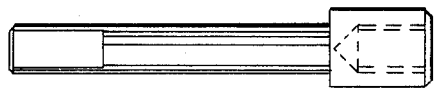
FIG. 14 is a side elevational view of an adapter member.
Figure 15A:
FIG. 15a is a top plan view of the drill bit member shown in FIG. 15.
Figure 15:
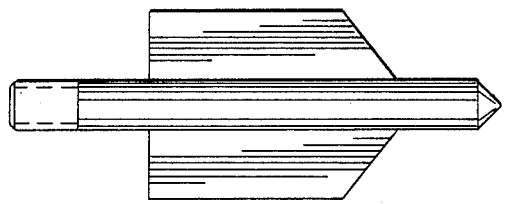
FIG. 15 is a side elevational view of a drill bit that can be mounted in the adapter member of FIG. 14.

An adapter member 46 is shown in FIG. 14, and is provided so that a bladed drill bit 18 as shown in FIG. 15 or an unbladed aerating drill bit 18a as shown in FIG. 16 can be operably connected to the motor means on an interchangeable basis. More specifically, the proximal end 19 of the bladed drill 18 can be inserted into the enlarged portion 17 of the adapter member, or the proximal end 19a of the unbladed drill bit 18a can be inserted into such enlarged portion 17. It is of course not necessary to provide such adapter member 46, because each bladed drill bit or unbladed drill bit can be provided as shown in FIGS. 17-20, i.e., such bits may be constructed so that switching from a bladed to an unbladed bit requires removal of such bit from its mount. The differing configurations that the bits may take are clearly shown in such FIGS., but it is believed that no specific description of the same need be given. A single bit can be driven by a ⅜ inch electric drill to reach places where the machine cannot reach and a single bit can also be used where machine bit has encountered an obstruction such as a rock, roots, or the like.

FIG. 21 shows how base member 12 can be provided with radially elongated apertures 12a that permit radial adjustment of the respective drill bits 18, thereby increasing the versatility of the machine 10 by allowing its operator to easily change the spacing between holes to be drilled.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. An apparatus of the type designed to drill a plurality of equidistantly spaced bores in a lawn or other support surface, comprising, a flat, generally planar in configuration base member, a plurality of aperture members formed in said base member in equidistantly spaced relation to one another, a handle member pivotally mounted to said base member, a plurality of wheel members rotatably mounted to said base member and adapted to transport said base member relative to a support surface, a linkage means adapted to lower or raise said base member relative to a support surface when said handle member is in a first or second position, respectively, said linkage means including a pair of linkage members mounted in transversely spaced, substantially parallel relation to one another on opposite sides of said base member, each of said linkage members including an elongate interconnecting rod having its proximal end pivotally connected to said handle member, each of said linkage members including a pair of longitudinally spaced offset members, each of said offset members having an elongate major body portion and a truncate offset portion disposed substantially normal to and rearward of said major body portion at a first end thereof, said respective offset portions pivotally connected to an associated one of said interconnecting rods an axle member formed at a second end of said major body portion of said respective offset members rotatably mounting one of said wheel members to said base member, and said respective major body portions of said offset members being pivotally connected to said base member so that rearward pivoting of said handle member effects raising of said base member and forward pivoting thereof effects lowering of said base member.

2. The apparatus of claim 1, further comprising, a plurality of drill bit members, each of said drill bit members having an operative lower portion and an upper shank portion, said drill bit members rotatably mounted to extend through different ones of said aperture members such that the respective shank portions thereof are above a plane defined by said base member and the operative portions thereof are below said plane, and means imparting simultaneous and corresponding rotation to said drill bit members so that the lower operative portions of said respective drill bit members are in operative engagement with said support surface when said base member is in its lowered position and are disengaged from said support surface when said base member is in its raised position.

3. The apparatus of claim 2, wherein said means for imparting rotation includes a motor means mounted in vertically spaced relation to said base member, upwardly thereof, wherein said motor means has a rotatable output shaft, and wherein belt and pulley means are provided to interconnect said output shaft of said motor means to said shank portions of said drill bit members.

4. The apparatus of claim 3, wherein a pulley member is fixedly secured and conjointly rotatable with the respective shank portion of each of said drill bit members, said pulley members being disposed above the plane of said base member in vertically spaced relation thereto and operatively connected to said motor means output shaft by said belt and pulley means.

5. The apparatus of claim 4, wherein said aperture members are provided in the form of elongate, slot-shape openings so that the respective positions of the drill bit members extending therethrough are adjustable relative to one another.

6. The apparatus of claim 4, wherein said handle member is foldable mid-length thereof to reduce the space required to store said apparatus.

7. The apparatus of claim 4, wherein additional ones of said aperture members may be formed in said base member in any predetermined array so that the number of drill bit members rotatable by said output shaft member is virtually unlimited, and wherein said output shaft member is elongated to carry a plurality of vertically stacked pulley members as needed to drive said plurality of drill bit members and wherein a plurality of belt members associated with respective ones of said vertically stacked pulley members are provided to drive said plurality of drill members.

8. The apparatus of claim 4, wherein said shank portions and said operative portions of said drill bit members are independently formed and releasably coupled to one another so that differing operative portions may be interchanged as desired in the absence of a requirement to disconnect the respective shank portions thereof from said belt and pulley means.

* * * * *